United States Patent [19]

Kato et al.

[11] 3,752,574

[45] Aug. 14, 1973

[54] AUDIO-VISUAL APPARATUS

[75] Inventors: Saburo Kato, Tokyo; Saburo Hokari, Kawasaki, both of Japan

[73] Assignee: Kabushiki Kaisha Ricoh, Tokyo, Japan

[22] Filed: Aug. 25, 1971

[21] Appl. No.: 174,701

[30] Foreign Application Priority Data

Sept. 8, 1970 Japan.............................. 45/89253
Sept. 8, 1970 Japan.............................. 45/89254
Oct. 30, 1970 Japan............................. 45/108091

[52] U.S. Cl..................................... 353/19, 353/24
[51] Int. Cl.... G03b 31/06, G03b 1/48, G03b 21/14
[58] Field of Search........................ 353/98, 99, 120, 353/22, 23, 24, 65, 66, 67, 38

[56] References Cited
UNITED STATES PATENTS

| | | | |
|---|---|---|---|
| 2,705,436 | 4/1955 | Bradner | 353/52 |
| 3,525,566 | 8/1970 | Altman | 353/38 |
| 3,340,765 | 9/1967 | Herriott | 353/38 |
| 3,565,513 | 2/1971 | Akiyama | 353/22 |
| 3,264,767 | 8/1966 | Coffman | 353/120 |
| 3,185,776 | 5/1965 | Bender | 35/35 C |

Primary Examiner—Louis R. Prince
Assistant Examiner—A. J. Mirabito
Attorney—John J. McGlew and Alfred E. Page et al.

[57] ABSTRACT

An audio-visual apparatus simultaneously reproduces a sound magnetically recorded on a teaching material or audio-visual sheet and projects onto a screen a writing or picture printed or otherwise superposed on the sheet. The apparatus includes a magnetic sound reproducer having a record mounting surface adapted to support a audio-visual sheet with its magnetic record surface facing downwardly. A head, including a light source, a projecting lens and a reflector is positioned above the sound reproducing means, and directs light rays, reflected from the upper surface of the audio-visual sheet through the projection lens, to a screen. A Fresnel lens is pivotally mounted for pivoting toward the mounting surface to press against the audio-visual sheet carrying audio and visual recorded information, to maintain the sheet in a predetermined position on the sound reproducer. The audio-visual sheet includes a base formed with holes for correctly positioning the sheet on the support surface, a reflector surface provided on one surface of the base and a magnetic recording surface provided on the other surface of the base. A transparent layer is formed on the reflector surface and may carry the graphic material to be projected.

6 Claims, 4 Drawing Figures

PATENTED AUG 14 1973 3,752,574

INVENTORS
SABURO KATO - SABURO HOKAR

BY John J. McGlew
ATTORNEY

AUDIO-VISUAL APPARATUS

FIELD OF THE INVENTION

This invention relates to audio-visual apparatus and, more particularly, to a novel, improved and simplified audio-visual apparatus including magnetic sound reproducing means, a Fresnel lens, and optical system for projecting an graphic or visual material, associated with a magnetic recording, onto a screen.

BACKGROUND OF THE INVENTION

In various applications, an overhead projector, for projecting an image of a picture onto a screen, and a magnetic sheet sound reproducing unit, for reproducing a sound recorded on a magnetic sheet, have been used separately so that each serves its own functions, and such a combination is now used widely as an audio-visual aid. By structurally combining the two types of devices and a teaching material into a single device, it is possible to provide a novel audio-visual apparatus which facilitates the best use of the features of the two devices while obviating their defects.

An overhead projector is useful only for projecting images of pictures onto a screen, so that it is necessary for the operator, or some other person, to provide a commentary on the pictures. It is troublesome for such a person to repeat the same explanation each time there are fresh audiences. A magnetic sheet sound reproducing unit reproduces sound previously recorded on one surface of a magnetic recording sheet and, at the same time, projects a picture recorded on the other surface of the magnetic recording sheet so that audiences can see an image of the picture while listening to the reproduced sound. However, the size of the audiences which can be reached by such an apparatus is limited.

By structurally combining an overhead projector and a magnetic sheet sound reproducing unit into a single device, it is possible to provide a novel audio-visual apparatus which functions as an overhead projector, augmented with the sound of a magnetic sheet record, and capable of throwing a large picture onto a screen. For example, a teacher in a classroom may use this novel audio-visual apparatus as a teaching aid, and can teach a number of students merely by operating the apparatus to display pictures projected onto a screen on a large scale while the recorded sound is being reproduced to explain the projected picture or to transmit other information.

A prior art overhead projector, of the reflection type, comprises a lamp, serving as a light source, and a small reflector disposed in the upper portion. A Fresnel lens and a reflector, for reflecting upwardly an image of graphic or visual material, are disposed in the lower portion. The light rays from the lamp incident upon the picture to be projected, which is disposed below the lamp, are reflected upwardly by the reflector. The reflected light rays are condensed by the Fresnel lens positioned above the reflector and thus directed toward the small reflector disposed in the viscinity of the lamp, and which reflects the reflected rays of light in a horizontal direction so as to project an image of the original onto a screen.

Such a conventional overhead projector has disadvantages. For one thing, sheet to be projected is formed integrally with a Fresnel lens, with the result that the sheet is very expensive. For another, in one type of reflection procedure, in which the reflector and the Fresnel lens are formed substantially integrally by applying a reflecting material to the irregular surface of the Fresnel lens, the sheet to be projected must be placed over the Fresnel lens, thereby causing a double image of the visual material to be projected on the screen. This latter disadvantage will be described in further detail with reference to FIG. 4, which illustrates the manner of reflection of light rays by a Fresnel lens.

Referring to FIG. 4, a reflector surface is formed on an irregular surface 25a of a Fresnel lens 25, by depositing thereon, by vaporization in a vacuum, a material for forming a mirror surface. An original 26, of transparent material, carrying visual material to be projected by a projector using Fresnel lens 25, is superposed on the upper surface 25b of Fresnel lens 25. Light rays d, directed toward the original 26, pass through the original and through Fresnel lens 25, and our reflected, as light rays e, by the irregular surface 25a of Fresnel lens 25 so as to be directed toward a reflector lens disposed above the arrangement. Because the light rays d and the light rays e, of specular reflection, pass through original 26, a double image of the visual or graphic material on the original is projected onto the screen. In addition to the light rays e of specular reflection, light rays f of irregular reflection from the surface of the original 26 are also directed toward the reflector lens. As a result, a weak image of the original is formed on the screen by irregular reflection, in addition to a regular image of the original. This double image exhibits a greater discrepancy between the regular and the shadow images, in being further displaced from the center of the projected picture.

SUMMARY OF THE INVENTION

In accordance with the invention, an audio-visual apparatus comprises an overhead projector, in the upper part of the apparatus, and a magnetic sheet sound reproducing means, in the lower portion of the apparatus. A Fresnel lens, of substantially the same size as the magnetic recording sheet used with the reproducing machine, is pivotally mounted for swinging down against a magnetic sheet supported on a supporting surface of the magnetic sound reproducer. The invention is further directed to an audio-visual sheet adpated for use with the audio-visual apparatus. Additionally, the invention arrangement provides sheet mounting means which avoid formation of a double image on a screen, when a picture is projected onto the screen by the audio-visual apparatus.

An advantage of the invention is that the formation of a double image on the screen can be avoided. Another advantage resides in the fact that the cost for producing an audio-visual record sheet to be projected can be reduced, by separating the sheet from the Fresnel lens and pivotally connecting sheet hold-down means, including the Fresnel lens, to the main body of the sound reproducer, for swinging down into engagement with an audio-visual sheet.

A further advantage of the invention is that, by combining the visual material sheet to be projected, reflector means, and the magnetic record sheet into a single audio-visual sheet, a teaching material for the overhead projector and a teaching material for the magnetic sound reproducer can be prepared simultaneously and their handling is facilitated.

An object of the invention is to provide an improved audio-visual apparatus comprising an overhead projector and a magnetic sheet type sound reproducer.

Another object of the invention is to provide such an audio-visual apparatus utilizing a Fresnel lens of substantially the same size as a magnetic recording sheet used with the magnetic sound reproducer.

A further object of the invention is to provide such an audio-visual apparatus in which the Fresnel lens serves to hold down the audio-visual sheet against a sheet supporting surface of this magnetic sound reproducer.

Another object of the invention is to provide a novel audio-visual sheet adapted for use with the auto-visual apparatus.

A further object of the invention is to provide audio-visual sheet mounting means which avoid formation of a double image on a screen when a picture is thrown onto the screen by the audio-visual apparatus.

For an understanding of the principles of the invention, reference is made to the following description of a typical embodiment thereof as illustrated in the accompanying drawing.

DESCRIPTION OF THE PREFERRED EMBODIMENT

Figure 1:
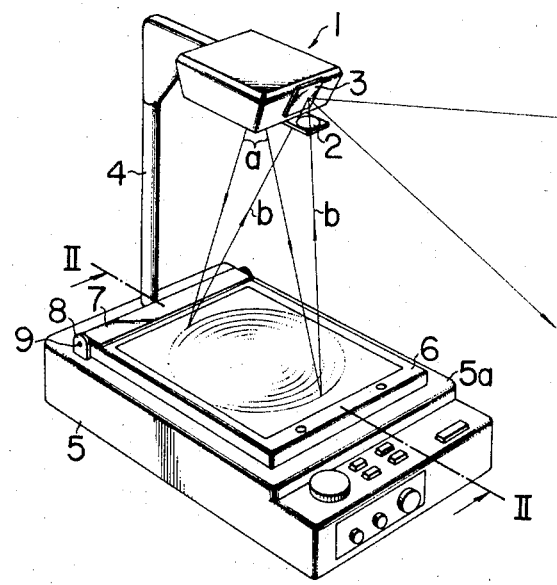
FIG. 1 is a perspective view of an audio-visual apparatus in accordance with one embodiment of the invention.

Referring to FIG. 1, a projection lamp (not shown), having a low level of brightness, is built into the interior of a head 1 of an overhead projector, in a well known manner, so as to direct light rays downwardly as indicated by the arrows a. Head 1 further includes a projection lens 2 for condensing reflected light rays b, described subsequently, and a reflector 3 for directing the light rays, passing through lens 2, toward a screen (not shown). A support 4 for head 1 has its base secured to one end of an upper surface or record support 5a of a well known form of magnetic sound reproducing means 5 for reproducing sound magnetically recorded on a magnetic sheet. A pivotally mounted sheet holddown means 6 is arranged on the upper surface 5a of reproducing means 5, and a mounting member 7, secured to one end of sheet hold-down means 6, is pivotally connected, by a pivot 9, to a retaining or holding member 8 secured to the upper surface 5a of reproducing means 5.

Figure 2:
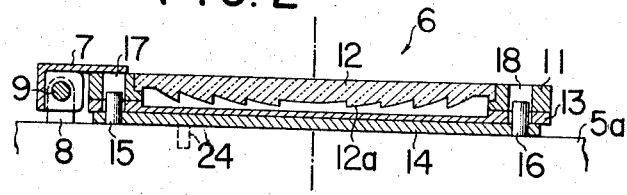
FIG. 2 is a sectional view taken along the line II—II of FIG. 1 and separately illustrating an audio-visual sheet and a pivotally mounted sheet hold-down means.

Referring to FIG. 2, hold-down means 6 comprises a square frame plate 11, a Fresnel lens 12 and a style strip 13. Fresnel lens 12 is secured to frame plate 11 by being fitted therein with its irregular surface 12a facing downwardly. Transparent style strip 13, which is secured to the underside of frame plate 11, performs the functions of protecting the irregular surface 12a of Fresnel lens 12 and of holding down an audio-visual sheet 14 resting on the upper surface 5a of reproducing means 5. Pins 15 and 16 are secured to the upper surface 5a of reproducing means 5, to project upwardly therefrom, for positioning sheet 14, and apertures or holes 17 and 18 are formed in frame plate 11 and style strip 13 to receive pins 15 and 16.

Figure 3:
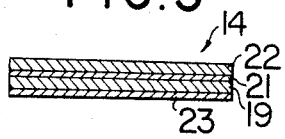
FIG. 3 is a fragmentary enlarged sectional view of the audio-visual sheet.
Figure 4:
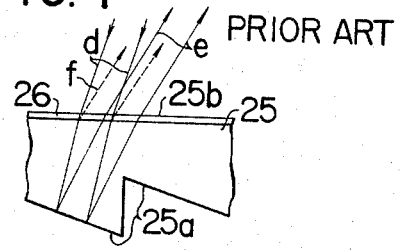
FIG. 4 is a fragmentary enlarged sectional view explaining the manner of reflection of light rays by a Fresnel lens when a conventional teaching material sheet is used.

Referring to FIG. 3, audio-visual sheet 14 comprises a base 19, a reflector 21, a transparent sheet 22 carrying visual or graphic information and a magnetic recording sheet 23 combined into a single compound audio-visual sheet. A pick-up head 24 of reproducing means 5 is adapted to engage the undersurface of magnetic recording sheet 23, as shown in FIG. 2, when the audio-visual sheet is mounted on supporting surface 5a of reproducing means 5. Head 24 moves along a spiral magnetic track formed on the undersurface of magnetic sheet 23.

Reflector 21 can be eliminated by providing a reflector surface on the upper surface of base 19 of sheet 14, or the base itself may be made from aluminum or other reflecting material. The transparent sheet 22 can be eliminated if writing or a picture is superposed on reflector 21.

By superposing the sheet carrying the graphic material, the reflector and the magnetic record sheet on each other, and thus forming a compound single audio-visual sheet, it is possible to provide, in a single operation, graphic material, to be projected by the overhead projector, and a magnetic record sheet, to be reproduced by reproducing means 5.

On the other hand, the Fresnel lens, which has hitherto been provided with each sheet containing graphic material, has been separated therefrom and pivotally connected to the reproducing means, in accordance with the invention. This is condusive to reduced production costs of audio-visual sheets, because it is not necessary to provide a Fresnel lens on each sheet, as is the case with conventional overhead projectors.

While a specific embodiment of the invention has been shown and described in detail to illustrate the application of the principles of the invention, it will be understood that the invention may be embodied otherwise without departing from such principles.

What is claimed is:

1. An audio-visual apparatus comprising, in combination, magnetic sound reproducing means having a record support adapted to support an audio-visual record sheet, having a magnetic recording on one surface and graphic material on its other surface, with its magnetic recording surface facing downwardly while on said record support; a head including an illuminating light source, a projector lens and a reflector, said reflector directing, toward a screen, light rays reflected from said other surface of said sheet and passing through said projection lens; means supporting said head above said record support; and support means pivotally mounted on said magnetic sound reproducing means for supporting a Fresnel lens for pivotal movement toward said record support, said Fresnel lens having its irregular surface directed toward said audio-visual record sheet on said record support, said support maens clamping said audio-visual sheet in a predetermined position on said record support.

2. An audio-visual apparatus, as claimed in claim 1, including positioning means on said record support cooperable with mating positioning means in said audio-visual sheet to correctly position said sheet on said sound reproducing means.

3. An audio-visual apparatus, as claimed in claim 2, in which said positioning means on said record support comprises upwardly projecting pins engageable in correspondingly located apertures in said audio-visual sheet.

4. An audio-visual apparatus, as claimed in claim 3, in which said audio-visual sheet comprises a base formed with at least two apertures for receiving said pins, a reflector surface on one surface of said base, and a magnetic recording surface on the opposite surface of said base.

5. An audio-visual apparatus, as claimed in claim 4, including a transparent layer on said reflector surface.

6. An audio-visual apparatus, as claimed in claim 1, in which said lens support means includes a frame plate mounting said Fresnel lens with its irregular surface facing downwardly; means pivotally connecting one edge of said frame plate to a location on said sound reproducing means spaced sufficiently from said record support so as not to interfere with mounting of said audio-visual sheet on said record support; and a transparent plate secured to said frame plate in protecting relation to the irregular surface of said Fresnel lens.

* * * * *